May 19, 1931.  E. F. WESTON  1,805,608
MAGNETO
Filed May 27, 1929  3 Sheets-Sheet 1
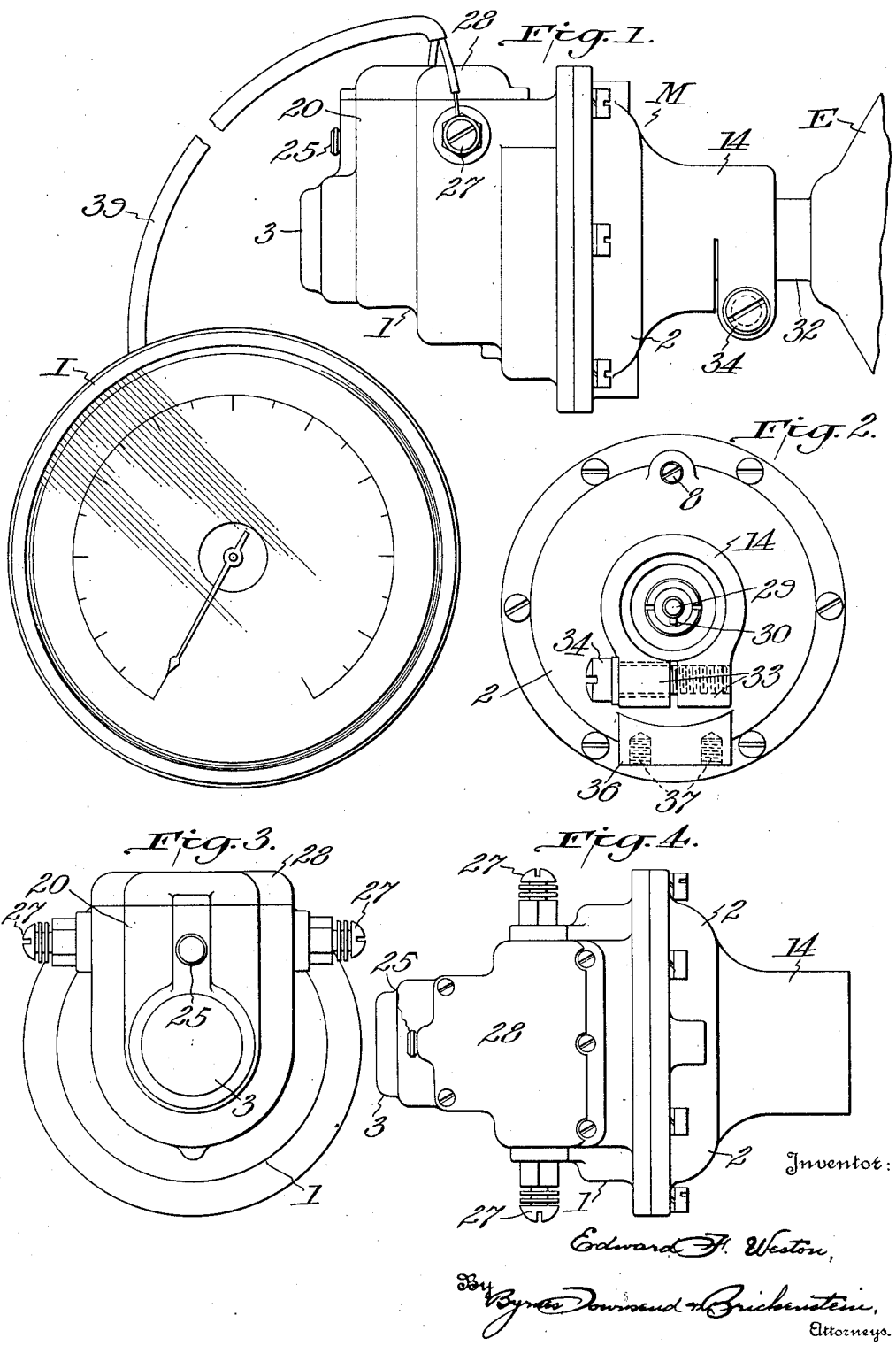
Inventor:
Edward F. Weston,
By Byrnes Townsend & Brickenstein,
Attorneys.

May 19, 1931. E. F. WESTON 1,805,608
MAGNETO
Filed May 27, 1929  3 Sheets-Sheet 2

Inventor:
Edward F. Weston,
By Byrne Townsend & Bickenstein,
Attorneys.

May 19, 1931.   E. F. WESTON   1,805,608
MAGNETO
Filed May 27, 1929   3 Sheets-Sheet 3

Inventor:
Edward F. Weston,
Attorneys.

Patented May 19, 1931

1,805,608

UNITED STATES PATENT OFFICE

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY

MAGNETO

Application filed May 27, 1929. Serial No. 366,488.

This invention relates to improvements in electric tachometers or speed indicating systems, and particularly to tachometers adapted for use on aeroplanes or in other positions where relatively small size and light weight are desired.

In spite of the recognized limitations of the mechanically operated tachometers employed on aeroplanes, they have gone into general use and the aeroplane engines are usually provided with a slotted shaft for receiving the flexible drive shaft of a centrifugally operated indicating instrument. In most installations where the instrument is located on the panel board, the flexible drive shaft is so long that it "whips" when the engine is operating within certain speed ranges and causes the indicator needle to vibrate over a wide range. Such whipping may be avoided by placing the instrument at the engine, but this practice is open to the objection that moisture collects on the instrument glass and renders it difficult or impossible for the operator to read the instrument.

The relatively heavy weight of electric tachometers having an accuracy suitable for use on aeroplanes has prevented their general adoption. In addition to the weight of the magneto, voltmeter and connecting wires, it has usually been necessary to employ extra parts for connecting the electric tachometers to the speed indicating shafts of the engines, since such shafts and their associated tubular housings have been designed for the reception of the flexible shaft and the flexible housing which is employed with the centrifugally operated tachometers.

An object of the present invenion is to provide an electric tachometer of such small size and light weight that it is adapted for use on aeroplanes. A further object of the invention is to provide a tachometer in which the magneto casing and armature shaft may be directly connected to the shaft and housing of an aeroplane engine or the like. A further object of the invention is to provide a magneto of small size and having a magnetic shunt for effecting calibration thereof.

These and other objects of the invention will be apparent from the following specification when taken with the accompanying drawings in which:

Fig. 1 is a fragmentary side elevation showing the speed indicator connected to an engine casing;

Figs. 2 and 3 are end elevations of the magneto;

Fig. 4 is a plan view of the magneto;

As shown in Fig. 1, the tachometer includes an indicating instrument I of the voltmeter or millivoltmeter type, and a magneto M which may be secured directly to the casing of the engine E.

Figure 5:
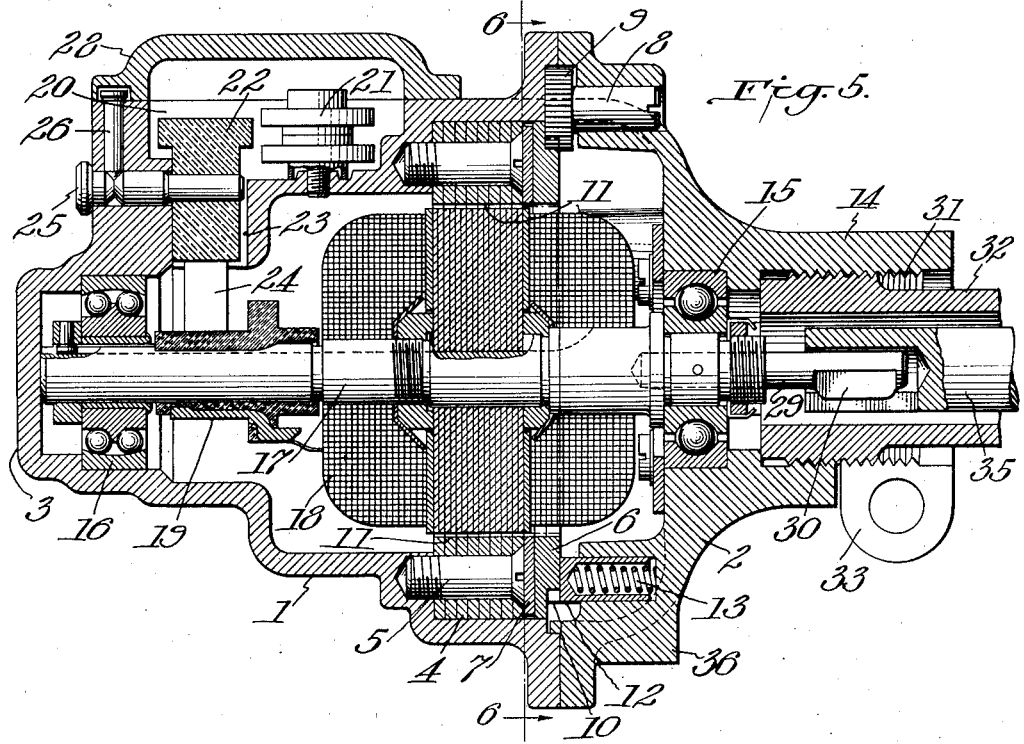
Fig. 5 is a longitudinal central section through the magneto and the associated parts of an engine casing.
Figure 6:
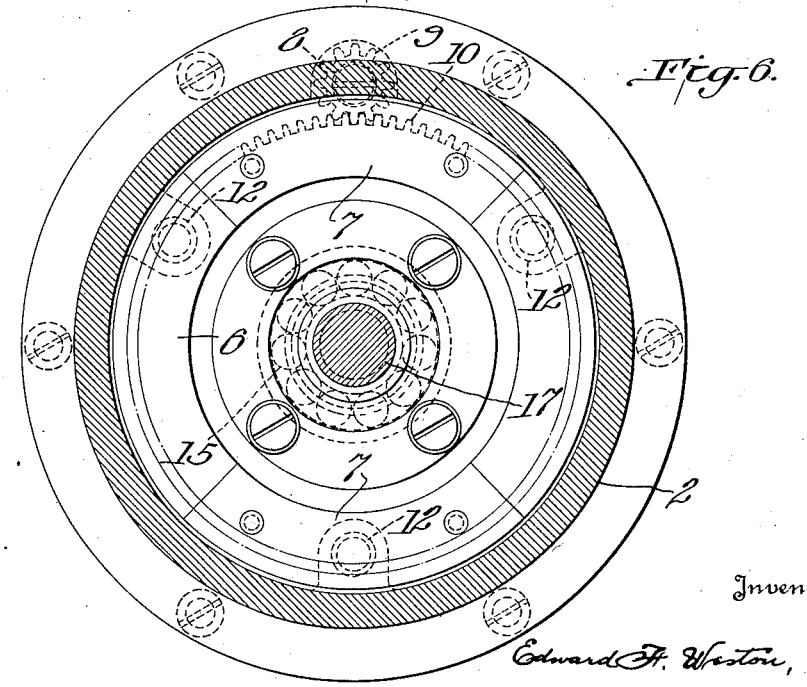
Fig. 6 is a transverse section taken on line 6—6 of Fig. 5.
Figure 7:
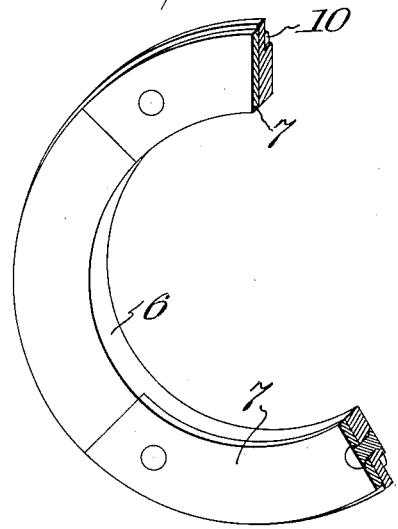
Fig. 7 is a fragmentary perspective view of the magnetic shunt.
Figure 8:
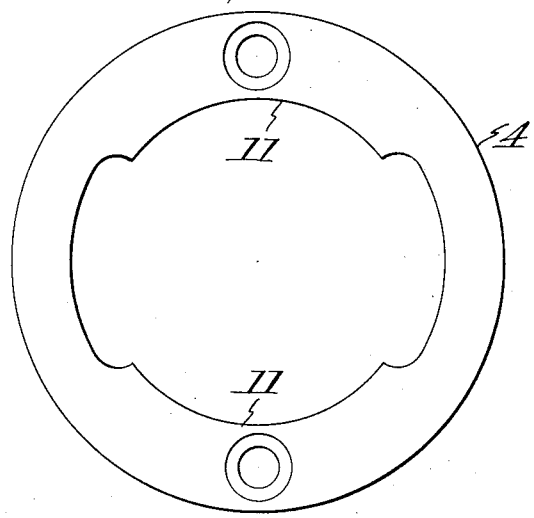
Fig. 8 is a plan view of the permanent magnet of the magneto.

As shown in Fig. 5, the magneto casing is formed by two hollow members 1, 2, whose opposed open ends abut against each other to define the space for receiving the armature, shaft and bearings thereof. The interior walls of the casing member 1 define a series of cylindrical spaces of successively smaller diameter as viewed from the open end of the casing member and the smaller end of the member is closed by an end wall 3. A double pole, circular magnet 4, preferably of laminated construction, is seated within the largest cylindrical space provided by the casing member 1 and is secured therein by screws 5 which pass through apertures in the magnet. An annular ring 6 of non-magnetic material but having two segments 7 of magnetic material recessed into the inner face thereof is also located within the outer portion of the casing member 1 and is of such diameter that it is guided by and rotatable within the casing. The casing member 2 is apertured to provide a bearing for the shaft 8 of a gear 9 which meshes with an annular rack 10 on the ring 6 to adjust the angular position of the magnetic shunt 7 with reference to the poles 11 of the magnet 4. To maintain the magnetic shunt in close contact with the face of the magnet a plurality of plungers 12 are mounted within the casing member 2 and are yieldingly pressed against the ring 6 by the springs 13.

The walls of the casing member 2 define an outer tubular portion 14 which terminates adjacent the casing member 1, in a flaring head which seats against the open end of the casing member 1. A ball race 15 is seated within the inner end of the tubular portion of the casing member 2 and a second ball race 16 is carried by the closed end of the casing member 1. The armature shaft 17 is mounted in the ball bearings and carries the armature 18 and commutator 19.

The outer surface of the casing member 1 is provided with flanges or ribs 20 which define a shallow recess within which the resistance spool 21 is mounted. A brush holder 22 is located in a passage 23 which extends between the shallow recess and the interior of the casing member, and carries brushes 24 which bear upon the commutator 19. To equalize the contact pressure, the brush holder is pivotally mounted upon a pin 25 whose axis is parallel to the axis of the shaft 17 and which is retained in position by a locking pin 26 which extends radially into the end wall of the shallow recess. This construction is also described and claimed in my copending application, Serial No. 232,660, filed November 11, 1927. Suitable terminals 27 extend through and are insulated from the flanges 20 and the shallow recess is closed by the cover plate 28 which extends over and retains the locking pin 26 in position.

The armature shaft may be extended within the tubular portion 14 of the casing member 2 for connection to the drive shaft of the engine but preferably a short shaft 29 having a lateral rib 30 is fixed to the inner end of the shaft 17. The inner wall of the tubular extension 14 is provided with threads 31 for mounting the magneto upon the tubular sleeve 32 of the engine casing and preferably the outer portion of the extension 14 is split longitudinally as at 33, the split portions being apertured to receive a screw 34 for locking the tubular extension in place upon the sleeve 32. The slotted shaft 35 of the engine is housed within the tubular sleeve 32 and the non-circular portion of the shaft 29 engages the shaft 35 when the magneto casing is threaded upon the sleeve 32.

The casing member 2 is also provided with a flange 36 having threaded recesses 37 therein for receiving bolts to secure the magneto to a supporting plate or flange, but the sole means for connecting the magneto to and supporting it from the usual type of engine casing is the tubular extension 14 of the casing member 2. The supporting flange 36 may, of course, be omitted, but it is preferably made a part of the magneto even when it is intended for use with an aeroplane.

The instrument casing is preferably formed of aluminum or an aluminum alloy, and the flexible conductor 39 which extends from the magneto M to the instrument I may be of any standard, but preferably light construction.

As indicative of the small size and light weight which is made possible by the present invention, the particular magneto from which the drawings were prepared had a maximum diameter of three inches and a length, including the tubular supporting sleeve, of $4\frac{5}{32}$ inches, the weight of the magneto being but slightly in excess of two pounds. The performance of the magneto demonstrated, however, that the reduction in size and weight had not been accompanied by any reduction in the accuracy of the system.

It is to be understood that the invention is not limited in its application to any particular size of magneto since the novel structural features may be employed in the construction of magnetos either larger or smaller than the one mentioned above.

Various changes may be made in the several parts, their relative size, shape and arrangement without departing from the spirit of my invention as set forth in the following claims.

I claim:

1. A magneto comprising an armature, a circular magnet having pole pieces cooperating with said armature, a casing housing said armature and magnet, a magnetic shunt supported in said casing for angular adjustment about the axis of said magnet, and means for angularly adjusting said shunt about its axis.

2. A magneto comprising an armature, a casing formed by two elements whose meeting surfaces lie in a plane substantially normal to the axis of said armature, a circular magnet seated in one of said casing elements and having pole pieces for cooperation with said armature, a magnetic shunt, means supporting said shunt for angular adjustment about the axis of said magnet, and means for angularly adjusting said shunt about said axis.

3. The invention as set forth in claim 2, wherein is provided means for frictionally holding said shunt in any position of adjustment.

4. The invention as set forth in claim 2, wherein one of said casing elements is provided with an internal annular shoulder and said magnet is seated against said shoulder.

5. The invention as set forth in claim 2, wherein said shunt comprises a plate of magnetic material having the form of a sector of an annulus, and said supporting means comprises an annular plate whose peripheral edge is journaled upon the inner surface of said casing, in combination with means for maintaining said shunt in contact with the adjacent face of said magnet.

6. In a magneto, the combination with a magnet, armature and armature shaft, of a pair of casing members each having an open end, the end surfaces defining said open ends being held against each other when said casing members are assembled to enclose said magnet, armature and armature shaft, exterior flanges on one of said casing members defining a shallow recess, a passage affording communication between said recess and the interior of the said flanged casing member, a brush holder mounted in said passage, and a cover plate for closing said recess.

7. In a magneto, a casing element whose interior walls define a series of cylindrical spaces of successively smaller diameter as viewed from the open end of said element, a bearing within the smallest of said cylindrical spaces, a circular magnet within said casing at the largest of said cylindrical spaces, an annular ring carrying a magnetic shunt adjacent said circular magnet, a second casing element having a tubular portion terminating in a flaring head which seats against the open end of said first casing element, a bearing at the inner end of said tubular portion, an armature within the housing formed by said casing elements and having its shaft supported in said bearings, said shafts projecting beyond said second bearing and into said tubular portion of said second casing member, the said tubular portion being threaded for connecting the magneto to and supporting the same from the machine with which said magneto is to be associated.

8. In a magneto, a pair of casing members each having stepped interior walls defining a series of coaxial, cylindrical spaces of successively smaller diameter, said casing members having the edges of their larger ends secured together to thereby form a substantially cylindrical chamber having a central annular channel, a ring-shaped magnet, a magnetic shunt and means for angularly adjusting the same disposed in said channel, a shaft extending axially through said chamber and an armature mounted on said shaft and extending through said magnet.

9. The invention as set forth in claim 8, wherein a bearing is disposed in each casing member in the cylindrical space most remote from the larger end of the member.

10. In a magneto, a multi-part casing whose interior walls define a space for receiving the magnet, the armature and shaft of the magneto, one section of said casing having exterior flanges defining a shallow recess, a passage extending between said recess and the interior of said casing, a brush holder in said casing and supported from one of said flanges, a resistance winding in said recess, terminals extending through said flanges, and a cover plate for closing said recess.

11. The invention as set forth in claim 10 wherein a pivot pin projects through the end flange of said recess to support said brush holder for angular movement about an axis parallel to the armature shaft.

12. The invention as set forth in claim 10 wherein a pivot pin projects through the end flange of said recess to support said brush holder for angular movement about an axis parallel to the armature shaft, and a locking pin extends radially into said end flange to prevent removal of said pivot pin, said locking pin being held in place by said cover plate.

13. In a magneto adapted to be operated by a machine having a driving shaft which terminates in a coupling member positioned within a tubular sleeve, a casing comprising elements whose interior surfaces define a space of substantially circular cross-section, an armature element and a permanent magnet element within said casing, a shaft carrying one of said elements for rotation with respect to the other element, coupling means on one end of said shaft for engagement with the coupling member of the driving shaft, a tubular extension on said casing and housing said shaft coupling means, and means on said tubular extension for securing the same to said tubular sleeve when said magneto is positioned to effect engagement of said coupling member and said coupling means, thereby connecting said casing to the frame of the machine with which said magneto is to be associated.

14. In a magneto adapted to be operated by a machine having a driving shaft which terminates in a coupling member positioned within a tubular sleeve, a casing comprising elements whose interior surfaces define a space of substantially circular cross section, bearings carried by said elements, an armature in said casing and having its shaft revolubly supported by said bearings, coupling means on one end of said armature shaft for engagement with the coupling member of said driving shaft, a tubular extension on said casing and housing said armature shaft coupling means, and means on said tubular extension for securing the same to said tubular sleeve when said magneto is positioned to effect engagement of said coupling member and coupling means, thereby connecting said casing to the frame of the machine with which said magneto is to be associated.

In testimony whereof, I affix my signature.

EDWARD F. WESTON.